US012694719B2

(12) United States Patent
Lu et al.

(10) Patent No.: US 12,694,719 B2
(45) Date of Patent: Jul. 28, 2026

(54) METHOD, DEVICE AND NON-TRANSITORY COMPUTER-READABLE STORAGE MEDIUM FOR DETECTING DEEPFAKE OF FACE VIDEO

(71) Applicant: Nanning FuLian FuGui Precision Industrial Co., Ltd., Nanning (CN)

(72) Inventors: Qian Lu, Shenzhen (CN); Hai-Yuan He, Shenzhen (CN)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 188 days.

(21) Appl. No.: 18/749,673

(22) Filed: Jun. 21, 2024

(65) Prior Publication Data

US 2025/0246024 A1     Jul. 31, 2025

(30) Foreign Application Priority Data

Jan. 31, 2024     (CN) .......................... 202410141658.8

(51) Int. Cl.
*G06V 40/40* (2022.01)
*G06V 10/56* (2022.01)
(Continued)

(52) U.S. Cl.
CPC .............. *G06V 40/40* (2022.01); *G06V 10/56* (2022.01); *G06V 20/49* (2022.01); *G06V 40/161* (2022.01); *G06V 40/171* (2022.01)

(58) Field of Classification Search
CPC ........ G06V 40/40; G06V 10/56; G06V 20/49; G06V 40/161; G06V 40/171; G06V 20/41; G06V 20/46; G06V 40/168; G06V 40/172; G06V 20/40; G06V 40/16; G06V 40/162; G06V 40/164; G06V 40/165; G06V 40/167; G06V 40/169; G06V 40/173; G06V 40/178; G06V 40/179; G06V 40/45; G06V 10/454; G06V 10/54; G06V 10/7764; G06V 10/774; G06V 10/82; G06V 10/84; G06V 30/18057; G06V 20/698; G06V 30/19173;
(Continued)

(56) References Cited

U.S. PATENT DOCUMENTS 12,525,056 B2 *  1/2026  Lee ...................... G06V 40/172
2019/0014884 A1 *  1/2019  Fu .......................... G06T 1/0007
(Continued)

FOREIGN PATENT DOCUMENTS

CN        106022378 B      5/2019
CN        110458063 A      11/2019
(Continued)

*Primary Examiner* — Jose L Couso
(74) *Attorney, Agent, or Firm* — ScienBiziP, P.C.

(57)        ABSTRACT

A method, a device and a non-transitory computer-readable storage medium for detecting deepfake in face video, the method first performing a frame-splitting process on the video to be detected, and performing face recognition on each frame image after the frame-splitting process to obtain a recognized face and a face region. Next, extract the region covered by an edge of the face region in the consecutive frame images, and detect a still region from the covered region. Extract feature blocks in the still region, and determine whether the recognized face is a real face based on the changing state of the RGB value of each pixel in the feature blocks.

9 Claims, 4 Drawing Sheets

(51) Int. Cl.
G06V 20/40 (2022.01)
G06V 40/16 (2022.01)

(58) Field of Classification Search
CPC .................. G06V 30/194; G06T 7/269; G06T
2207/30201; G06T 7/002; G06T 3/4046;
G06T 5/60; G06T 9/002; G06T
2207/20076; G06T 2207/20081; G06T
2207/20084; G06T 2211/441; H04L
9/3231; G06N 3/02; G06N 3/08–088;
G06N 3/04; G06N 3/0445; G06N 3/0454;
G06N 3/0464; G06N 3/4046; G06N
3/4053; G06N 3/049; G06N 3/0499;
G06N 7/00; G06N 7/01; G06N 20/00;
G06K 7/1482; G06F 18/213; G06F
18/214; G06F 18/22; G06F 18/241; G06F
18/24; G06F 18/2411; G06F 18/2415;
G06F 18/253; G06F 30/27; Y10S
128/925
See application file for complete search history.

(56) References Cited

U.S. PATENT DOCUMENTS

2021/0314526 A1* 10/2021 Astarabadi ............. G06V 20/47
2022/0207263 A1 6/2022 Vexler et al.

FOREIGN PATENT DOCUMENTS

| | | | | | |
|---|---|---|---|---|---|
| CN | 113239727 | A | 8/2021 | | |
| CN | 108596141 | B | 5/2022 | | |
| CN | 116994175 | A | 11/2023 | | |
| KR | 20230070660 | A | * 5/2023 | ............. | G06T 7/194 |
| TW | M642547 | U | 6/2023 | | |
| TW | M643429 | U | 7/2023 | | |
| TW | 1824892 | B | 12/2023 | | |
| TW | 202401238 | A | 1/2024 | | |

* cited by examiner

METHOD, DEVICE AND NON-TRANSITORY COMPUTER-READABLE STORAGE MEDIUM FOR DETECTING DEEPFAKE OF FACE VIDEO

FIELD

A method, device and non-transitory computer-readable storage medium for detecting deepfake of face video.

BACKGROUND

Deepfake, an artificial intelligence technology that can simulate and fake audio and video content in a highly realistic way, has made great breakthroughs in recent years. The face video deepfake technology represented by Deepfake has rapidly become popular on the Internet and has been widely emphasized by academia and industry.

Deepfake technology synthesizes fake face videos by exchanging the identity information of the original face and the target face or editing the attribute information of the target face to achieve the purpose of making the fake look like the real one. While it has benign applications in people's lives, it is also maliciously used by wrongdoers, posing a great potential threat to both national security and social stability.

BRIEF DESCRIPTION OF THE DRAWINGS

Implementations of the present technology will now be described, by way of example only, with reference to the attached figures, wherein.

DETAILED DESCRIPTION

It should be understood that the detailed description and specific examples, while indicating exemplary embodiments, are intended for purposes of illustration only and are not intended to limit the scope of the claims.

Figure 1:
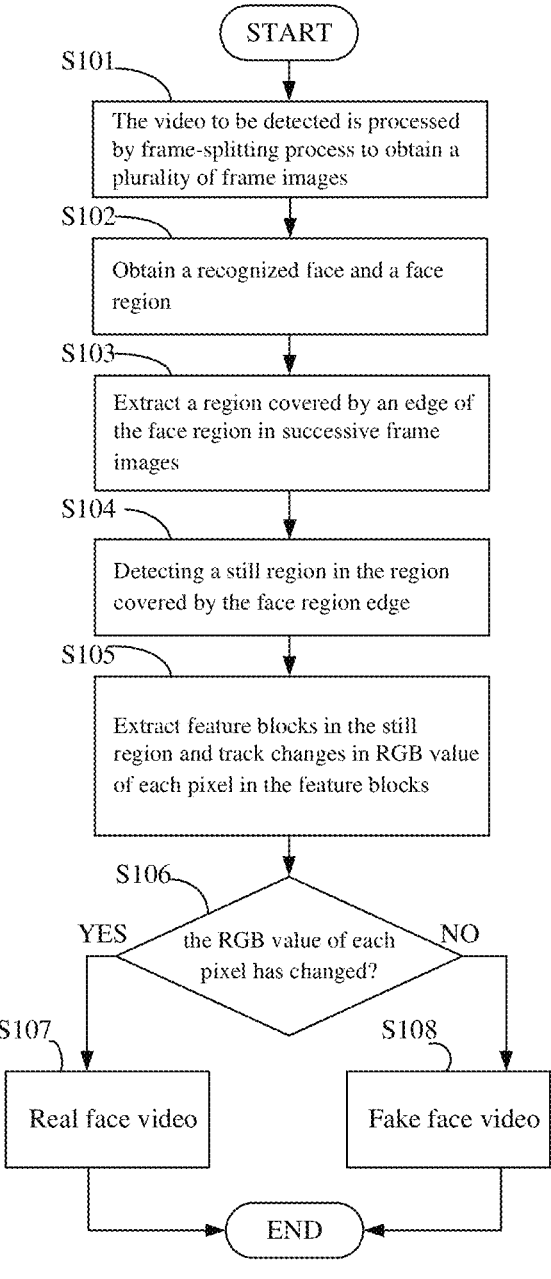
FIG. 1 is a flow chart of one embodiment of a method for detecting deepfake of face video of the present disclosure.

FIG. 1 is a flowchart of a method for detecting deepfake of face video. The method for detecting deepfake of face video can be applied to any electronic device that can receive video, such as cell phones, tablet computers, desktop computers, TV boxes and set-top boxes. It is to be noted that the embodiments in the present invention do not limit the manner or source of acquisition of the face video to be detected. In this embodiment, the method for detecting deepfake of a face video comprises the following steps:

Step S101, the video to be detected is processed by frame-splitting process to obtain a plurality of frame images.

Specifically, when developed using Python, the OpenCV library may be used to perform frame-splitting processing of the video to be detected and save it as a plurality of frame images.

Step S102, performing face recognition on each frame image to obtain a recognized face and a face region.

In one embodiment, each frame image of the video to be detected may include a face region and a non-face region, and a face recognition algorithm is used to perform face recognition on each frame image to obtain the recognized face and the face region. For example, when developed in Python, the face recognition can be performed using a pre-trained Dlib library, which can recognize 68 feature points of the recognized face, which include the nose, the eyes, the eyebrows, and the mouth, among others.

Step S103, extracting a region covered by an edge of the face region in successive frame images during a time period in which the recognized face appears.

In one embodiment, to speed up the detection speed, the left and right sides of the face below the eye feature point may be extracted as the edge of the face region. Step S104, detecting a still region in the region covered by the face region edge.

Assuming that the time period of the appearance of the face in step S103 is $T_0 \sim T_n$, the region covered by the face region edge is first identified in the frame image at the time $T_0 \sim T_n$.

Then, a coordinate system is established in the region covered by the edge of the face region, and the maximum and minimum values of the horizontal axis coordinates and the vertical axis coordinates of the target covered by the edge of the face region at the time $T_0 \sim T_n$ are extracted as $X_{MAX(T_0 \sim T_n)}$, $X_{MIN(T_0 \sim T_n)}$, $Y_{MAX(T_0 \sim T_n)}$ and $Y_{MIN(T_0 \sim T_n)}$, respectively. A rectangular region is determined according to the horizontal axis coordinates and vertical axis coordinates sitting target maximum and minimum values at the moment of $T_0 \sim T_n$, and the still region is detected in this rectangular region.

Detecting the still region in the rectangular region of the frame image is a motion detection process which can be realized by any conventional image processing algorithm capable of motion detection, such as the background difference method, the frame difference method, and the optical flow method.

Taking the optical flow method as an example, each pixel in the rectangular region is first given a velocity vector to form an optical flow field. According to the vector characteristics of each pixel, the motion status of the image in the rectangular area can be analyzed. If there are no moving objects in the image, the optical flow field changes continuously in the whole rectangular area; if there are moving objects in the image, there is relative motion between the moving objects and the image background, and the velocity vector formed by the moving objects must be equal to the velocity of the adjacent background. The vectors are different, so that moving objects and their positions can be detected, and the still region can also be detected.

Step S105, extracting feature blocks in the still region and tracking changes in RGB values of each pixel in the feature blocks during the face appearance period.

Step S106, determining whether the RGB value of each pixel has changed. If it is determined that the RGB value of each pixel does not change, step S107 is performed; otherwise, if it is determined that the RGB value of each pixel changes, step S108 is performed.

Step S107, determining that the video to be detected is a real face video.

Step S108, determining that the video to be detected is a fake face video.

For example, the face motion in the video to be detected is mainly swinging left and right. Through steps S104 and S105, the feature blocks of the still region on the right side of the face and the features blocks of the still region on the left side of the face can be extracted respectively when the face is swinging left and right, respectively.

Next, step S106, determines whether the RGB values of each pixel point of the feature blocks of the still region on the right side of the face and the feature blocks of the still region on the left side of the face have not changed during the face appearance time period.

Specifically, the RGB value of each pixel during the face appearance period can be tracked and recorded, and whether the RGB value of each pixel has changed after normalization is calculated. If the RGB values recorded at each pixel point are equal after normalization, the video to be detected is determined to be a real face video; if the RGB values recorded at each pixel point are not equal after normalization, the video to be detected is determined to be a fake face video.

In another embodiment, if the edge of the face area in the video is obscured by an obstacle, the covered area cannot be determined; or the movement of the face in the video to be detected is not large enough to extract the area in the covered area. If the still region is used as the subsequent determination and detection, the flow of the method for detecting deepfake of face video in FIG. 2 can be executed.

Figure 2:
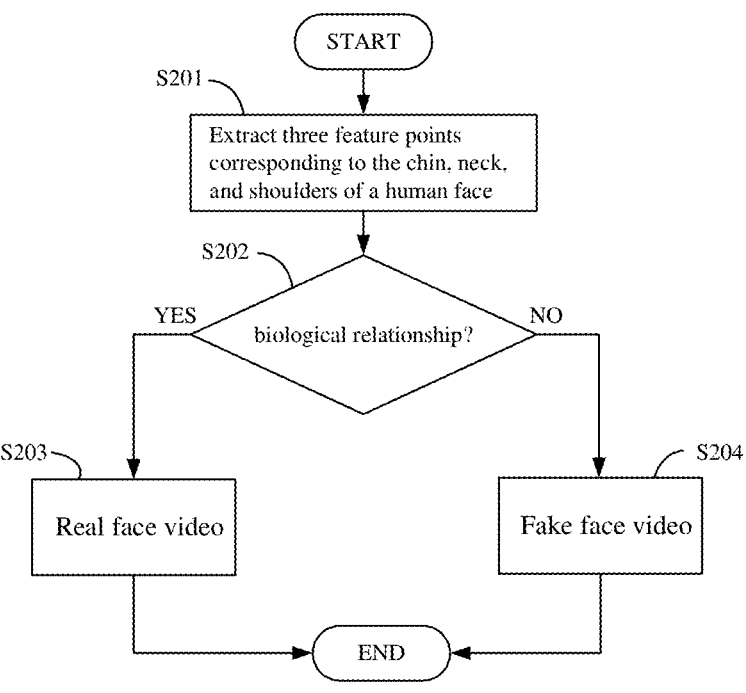
FIG. 2 is a flow chart of another embodiment of the method for detecting deepfake of face video of the present disclosure.

FIG. 2 is a flow chart of another embodiment of the method for detecting deepfake of face video.

Step S201, a first feature point corresponding to the chin of the human face, a second feature point corresponding to the neck, and a third feature point corresponding to the shoulder are extracted, respectively.

In an example, OpenCV with OpenPose for human key point detection can be used to extract the three feature points.

Step S202, determining whether there is a biological relationship between movements of the first feature point, the second feature point, and the third feature point.

Since the head, neck, and shoulders of the human body are connected by bones and muscles, when the head of the human body moves, the neck and shoulders of the human body move accordingly. In other words, there is a biological relationship between the number of movements and the frequency of movements of the three feature points should be the same in any period of time, which means that the movement patterns of the three feature points have the biological relationship. Therefore, a real face or a fake face could be detected by determining whether there is a biological relationship between the movements of the three feature points.

Specifically, whether the movements of the three feature points have a biological relationship can be determined based on the directions of movements, the amplitudes of movements, the number of movements, and the frequencies of movements of each of the three feature points during the time period in which the recognized face appears.

For example, if the first feature point corresponding to the chin of the human face moves in a first movement direction while the second feature point corresponding to the neck moves in a second movement direction in 180 degrees of inverse phase, and the second feature point moves such that the distance between the first feature point and the second feature point exceeds a possible distance difference, then it is determined at this time that there is no movement coordination among the three feature points.

If it is determined that the movements of the three feature points have a biological relationship, step S203 is executed.

If the movements of three feature points are determined have no biological relationship, step S204 is executed.

Step S203, determining that the video to be detected is a real face video.

Step S204, determining that the video to be detected is a fake face video.

Figure 3:
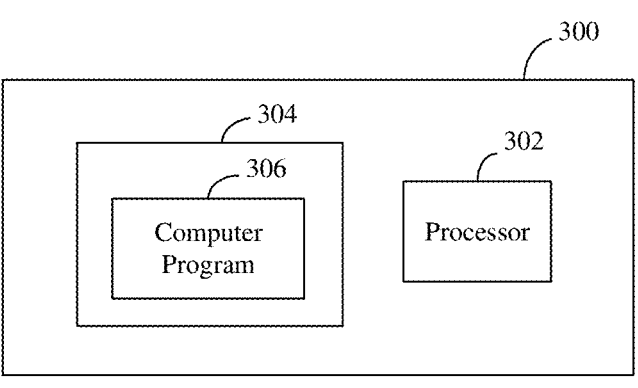
FIG. 3 is a block diagram of one embodiment of a device for detecting deepfake of face video of the present invention.

FIG. 3 is a block diagram of a device 300 for detecting deepfake of face video. The device 300 includes a processor 302, a memory 304, and a computer program 306, the device 300 being an electronic device.

It should be appreciated by those skilled in the art that the composition of the device 300 illustrated in FIG. 3 is not a limitation of the embodiments of the present invention, and that the device 300 illustrated in FIG. 3 is simplified for purposes of description, and in different embodiments may comprise a composition of fewer or more parts than illustrated.

In one embodiment, the processor 302 may comprise integrated circuits, e.g., it may comprise a single packaged integrated circuit, or it may comprise a plurality of integrated circuits packaged for the same function or for different functions, including one or more central processing units (CPUs), microprocessors, digital processing chips, graphics processors, and a combination of various control chips, and so on. The processor 302 is the control core (control unit) of the device 300 and uses various interfaces and circuits to connect various components of the entire device 300 to perform various functions of the device 300 and process data by running or executing a computer program 306 or module stored in the memory 304 and retrieving data stored in the memory 304, such as the method for detecting deepfake of face video.

In one embodiment, the memory 304 is used to store the code of a computer program 306 and various data, such as the method for detecting deepfake of face video, and to enable high-speed, automatic completion of access to the program or data during operation of the device 300. The memory 304 includes read-only memory (ROM), programmable read-only memory (PROM), erasable programmable read-only memory (EPROM, one-time programmable read-only memory (OTPROM), electrically erasable programmable read-only memory (EEPROM), compact disc read-only memory (CDR), and read-only memory (ROM). (EEPROM), Compact Disc Read-Only Memory (CD-ROM) or other optical disk memory, magnetic disk memory, magnetic tape memory, or any other computer-readable storage medium that can be used to carry or store data.

Figure 4:
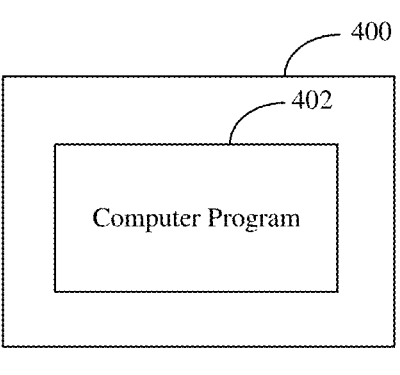
FIG. 4 is a block diagram of one embodiment of a non-transitory computer-readable storage medium for detecting deepfake of face video of the present invention.

FIG. 4 is a block diagram of a computer-readable storage medium 400 for detecting deepfake of face video. As shown in FIG. 4, the computer-readable storage medium 400 stores a computer program 402 that, when executed by a processor, implements the method for detecting deepfake of face video.

In summary, the method, device and non-transitory storage medium for detecting deepfake of face video can better avoid the problem of being unable to discriminate between a real face and a fake face due to the randomness of human behavior.

It will be apparent to those skilled in the art that various modifications and variations can be made to the disclosure without departing from the scope or spirit of the claims. In view of the foregoing, it is intended that the present disclosure covers modifications and variations, provided they fall within the scope of the following claims and their equivalents.

What is claimed is:

1. A method for detecting deepfake of a face video, the method being performed on an electronic device and the method comprising:

performing a frame-splitting process on the face video to be detected to obtain a plurality of frame images;

performing face recognition on each frame image to obtain a recognized face and a face region;

extracting a region covered by an edge of the face region in successive frame images within a time period in which the recognized face appears, establishing a coordinate system for the region covered by the edge of the face region;

extracting maximum and minimum values of horizontal axis coordinates and vertical axis coordinates covered by the edge of the face region edge during the time period;

determining a rectangular region based on the maximum and the minimum values of the horizontal axis coordinates and the vertical axis coordinates;

detecting a still region in the rectangular region covered by the edge of the face region;

extracting feature blocks in the still region and tracking changes in RGB value of each pixel of the feature blocks within the time period;

determining whether the RGB value of each pixel has changed;

determining that the video to be detected is a real face video in response that the RGB value of each pixel is determined have not changed; and determining that the video to be detected is a fake face video in response that the RGB value of each pixel is determined to have changed.

2. The method of claim 1, wherein the extracting a region covered by an edge of the face region in successive frame images within a time period in which a recognized face appears further comprises:

extracting left and right sides of the recognized face below an eye feature point as the edge of the face region.

3. The method of claim 1, wherein the detecting the still region in the rectangular region further comprises:

detecting the still region using a background difference method, a frame difference method, and an optical flow method.

4. The method of claim 1, wherein the method further comprises:

extracting a first feature point corresponding to a chin of the recognized face, a second feature point corresponding to a neck of the recognized face, and a third feature point corresponding to a shoulder of the recognized face; and determining whether there is a biological relationship between movements of the first feature point, the second feature point, and the third feature point;

determining that the video to be detected is a real face video in response that there is a biological relationship between the movements of the first feature point, the second feature point and the third feature point; and determining that the video to be detected is a fake face video in response that there is no biological relationship between the movements of the first feature point, the second feature point and the third feature point.

5. The method of claim 4, wherein that the determining whether there is a biological relationship between movements of the first feature point, the second feature point, and the third feature point comprises:

determining whether there is a biological relationship between movements of the first feature point, the second feature point, and the third feature point based on directions of movements, magnitudes of movements, number of times of movements, and frequencies of movements of each of the first feature point, the second feature point, and the third feature point during the time period.

6. The method of claim 1, wherein the performing a frame-splitting process on the face video to be detected to obtain a plurality of frame images comprises:

using an OpenCV library to perform the frame-splitting processing.

7. The method of claim 1, wherein the performing face recognition on each frame image to obtain a recognized face and a face region comprises:

using a pre-trained dlib library to perform the face recognition.

8. A device configured for detecting deepfake of face video, the device comprising:

a memory storing processor-executable instructions; and at least one processor coupled to the memory to receive the processor-executable instructions, wherein, upon execution of the processor executable instructions, the at least one processor:

performing a frame-splitting process on the face video to be detected to obtain a plurality of frame images;

performing face recognition on each frame image to obtain a face region;

extracting a region covered by an edge of the face region in successive frame images within a time period in which a recognized face appears;

establishing a coordinate system for the region covered by the edge of the face region;

extracting maximum and minimum values of horizontal axis coordinates and vertical axis coordinates covered by the edge of the face region edge during the time period;

determining a rectangular region based on the maximum and the minimum values of the horizontal axis coordinates and the vertical axis coordinates;

detecting a still region in the rectangular region covered by the edge of the face region;

extracting feature blocks in the still region and tracking changes in RGB values of each pixel of the feature blocks within the time period;

determining whether the RGB value of each pixel has not changed;

determining that the video to be detected is a real face video when it is determined that the RGB value of each pixel does not change; and determining that the video to be detected is a fake face video when it is determined that the RGB value of each pixel changes.

9. A non-transitory computer readable storage medium storing processor-executable instructions which, when executed by at least one processor, cause the at least one processor to perform a method for detecting deepfake of face video, the method comprising:

performing a frame-splitting process on the face video to be detected to obtain a plurality of frame images;

performing face recognition on each frame image to obtain a face region;

extracting a region covered by an edge of the face region in successive frame images within a time period in which a recognized face appears;

establishing a coordinate system for the region covered by the edge of the face region;

extracting maximum and minimum values of horizontal axis coordinates and vertical axis coordinates covered by the edge of the face region edge during the time period;

determining a rectangular region based on the maximum and the minimum values of the horizontal axis coordinates and the vertical axis coordinates;

detecting a still region in the rectangular region covered by the edge of the face region;

extracting feature blocks in the still region and tracking changes in RGB values of each pixel of the feature blocks within the time period;

determining whether the RGB value of each pixel has not changed;

determining that the video to be detected is a real face video when it is determined that the RGB value of each pixel does not change; and determining that the video to be detected is a fake face video when it is determined that the RGB value of each pixel changes.

* * * * *